United States Patent [19]
Bent et al.

[11] Patent Number: 5,613,237
[45] Date of Patent: Mar. 18, 1997

[54] HOUSING LATCH SYSTEM UTILIZING AN ELASTOMERIC INTERLOCKING BAND

[75] Inventors: Michael S. Bent, Greenacres; Melvin Teitzman, Lantana; Christopher R. Long, Boca Raton, all of Fla.

[73] Assignee: Motorola, Inc., Schaumburg, Ill.

[21] Appl. No.: 323,975

[22] Filed: Oct. 17, 1994

[51] Int. Cl.$^6$ ........................................... H04B 1/08
[52] U.S. Cl. ..................... 455/351; 455/347; 361/752; 361/814; 220/4.02
[58] Field of Search ........................... 455/347, 348, 455/349, 351, 89, 90; 361/730, 732, 752, 755, 758, 759, 814; 220/4.02, 4.21, 648, 683, 686

[56] References Cited

U.S. PATENT DOCUMENTS

| | | | |
|---|---|---|---|
| 4,972,508 | 11/1990 | King | 455/347 |
| 5,175,873 | 12/1992 | Goldenberg et al. | 455/351 |
| 5,265,275 | 11/1993 | Goldenberg et al. | 455/351 |
| 5,383,098 | 1/1995 | Ma et al. | 220/4.02 |
| 5,469,982 | 11/1995 | Gordecki et al. | 220/4.02 |

OTHER PUBLICATIONS

"An Elastomeric Housing Latch for a Pager or Similar Device" by Chris Long & Mel Teitzman, Motorola Technical Developments vol. 21, pp. 116–117, Feb. 1994, USA.

*Primary Examiner*—Chi H. Pham
*Assistant Examiner*—Thanh Le
*Attorney, Agent, or Firm*—John H. Moore

[57] ABSTRACT

A latch system for a housing includes front and rear housing sections (204, 202) having a common side periphery (212) when assembled. The housing sections (204, 202) include wall segments (208, 206) projecting therefrom. Each wall segment (208, 206) has a locking side (214) adjacent and parallel to the common side periphery (212) and has a recess (402, 210) therein for mating with an elastomeric interlocking band (100). The elastomeric interlocking band (100) includes teeth (102, 103) projecting therefrom for engaging with the recesses (402, 210) in the wall segments (208, 206). To latch together the front and rear housing sections (204, 202) the elastomeric interlocking band (100) is slidably assembled onto the wall segments (208, 206) of a first housing section (204, 202) until the teeth (102, 103) engage with the recesses (402, 210) therein. The wall segments (208, 206) of the remaining housing section (204, 202) are then slidably assembled into the elastomeric interlocking band (100) until the teeth (102, 103) engage with the recesses (402, 210) in the wall segments (208, 206) of the remaining housing section (204, 202), thereby latching together the front and rear housing sections (204, 202).

20 Claims, 5 Drawing Sheets

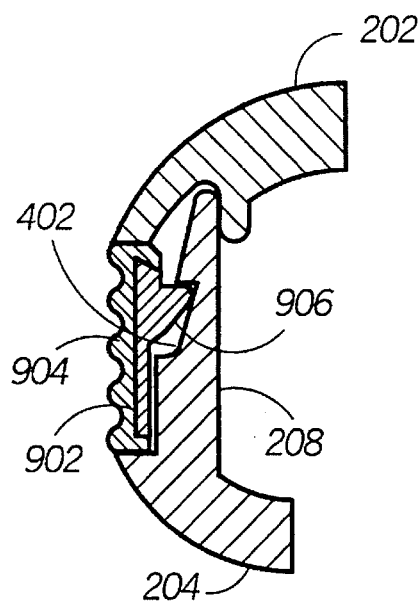
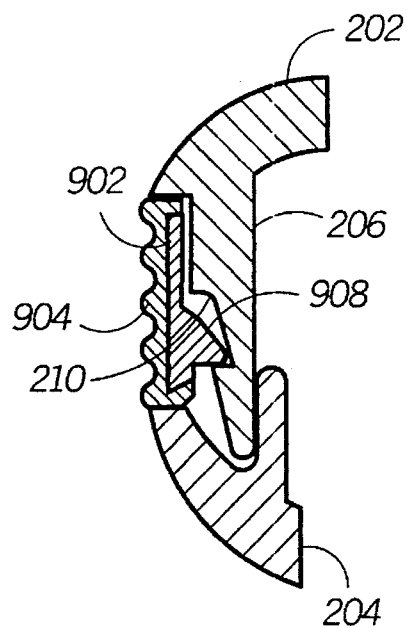
FIG.10  FIG.11
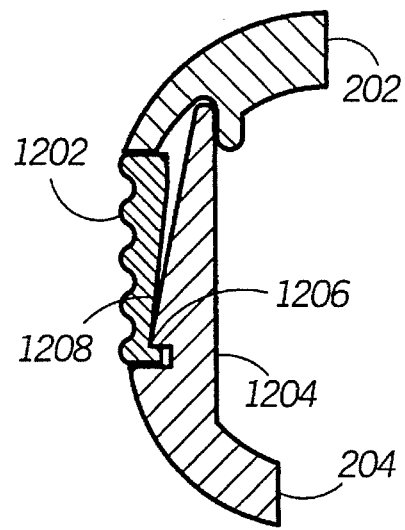
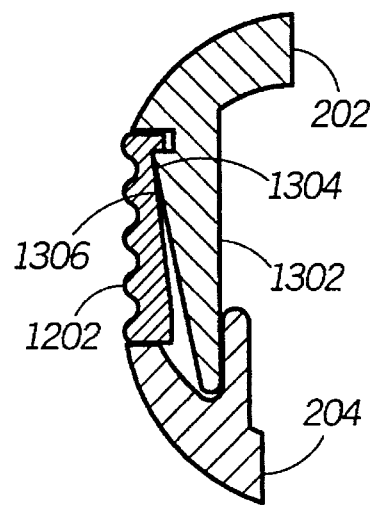
FIG.12  FIG.13

HOUSING LATCH SYSTEM UTILIZING AN ELASTOMERIC INTERLOCKING BAND

FIELD OF THE INVENTION

This invention relates in general to housing latch systems, and more specifically to a housing latch system utilizing an elastomeric interlocking band.

BACKGROUND OF THE INVENTION

Housings for electronic devices, such as selective call receivers, typically have been manufactured in two separable sections held together by a latching system so that the housings can be opened when required for service. For a device that is not considered to be user serviceable, it is preferable that the operation of the latching system be non-obvious for persons not specifically trained to service the device. On the other hand, operation of the latching system preferably should be easy and fast for those having the appropriate know-how and/or tools.

A problem with conventional latching systems has been a lack of water resistance at a seam at which the two separable sections meet. Various types of gaskets have been utilized to improve water resistance, but are not desirable because of increased parts count, additional cost, and additional assembly labor.

Thus, what is needed is a housing latch system that meets the requirements outlined above, while also providing a water-resistant seal without additional parts and labor. In addition, a housing latch system that is simple and easy to assemble during manufacture is desired.

SUMMARY OF THE INVENTION

One aspect of the present invention is a latch system for a housing. The latch system comprises front and rear housing sections having outer and inner surfaces and a common side periphery when assembled. The front and rear housing sections comprise a plurality of wall segments projecting rearward from the inner surface of the front housing section and projecting forward from the inner surface of the rear housing section. Each wall segment has a locking side positioned adjacent and parallel to the common side periphery and has a recess therein on the locking side, the recess positioned for mating with an elastomeric interlocking band. The latch system further comprises the elastomeric interlocking band, which comprises teeth projecting therefrom for engaging with the recesses in the wall segments. To latch together the front and rear housing sections the elastomeric interlocking band is aligned with the common side periphery of a first one of the front and rear housing sections and then slidably assembled onto the wall segments thereof until the teeth engage with the recesses in the wall segments, thereby latching the elastomeric interlocking band to the first one of the front and rear housing sections. A remaining one of the front and rear housing sections is thereafter aligned with the common side periphery, after which the wall segments thereof are slidably assembled into the elastomeric interlocking band until the teeth thereof also engage with the recesses in the wall segments of the remaining one of the front and rear housing sections, thereby latching together the front and rear housing sections.

A second aspect of the present invention is a selective call receiver comprising electronic elements, including an antenna for intercepting a selective call radio signal including an address and information, and a receiver element coupled to the antenna for demodulating the selective call radio signal to produce a demodulated signal. The electronic elements also include a processor coupled to the receiver element for processing the demodulated signal to derive the address and information, and an alerting device coupled to the processor for generating an alert in response to the address matching a predetermined address. The selective call receiver further comprises a housing mechanically coupled to the electronic elements for enclosing and supporting the electronic elements. The housing includes a latch system, comprising front and rear housing sections having outer and inner surfaces and a common side periphery when assembled. The front and rear housing sections comprise a plurality of wall segments projecting rearward from the inner surface of the front housing section and projecting forward from the inner surface of the rear housing section, each wall segment having a locking side positioned adjacent and parallel to the common side periphery and having a recess therein on the locking side, the recess positioned for mating with an elastomeric interlocking band. The latch system further comprises the elastomeric interlocking band, which comprises teeth projecting therefrom for engaging with the recesses in the wall segments. To latch together the front and rear housing sections the elastomeric interlocking band is aligned with the common side periphery of a first one of the front and rear housing sections and then slidably assembled onto the wall segments thereof until the teeth engage with the recesses in the wall segments, thereby latching the elastomeric interlocking band to the first one of the front and rear housing sections. A remaining one of the front and rear housing sections is thereafter aligned with the common side periphery, after which the wall segments thereof are slidably assembled into the elastomeric interlocking band until the teeth thereof also engage with the recesses in the wall segments of the remaining one of the front and rear housing sections, thereby latching together the front and rear housing sections.

A third aspect of the present invention is a latch system for a housing. The latch system comprises front and rear housing sections having outer and inner surfaces and a common side periphery when assembled. The front and rear housing sections comprise a plurality of wall segments projecting rearward from the inner surface of the front housing section and projecting forward from the inner surface of the rear housing section. Each wall segment has a locking side positioned adjacent and parallel to the common side periphery and has a tooth thereon projecting from the locking side, the tooth positioned for mating with an elastomeric interlocking band. The latch system further comprises the elastomeric interlocking band, comprising recesses therein for engaging with the teeth of the wall segments. To latch together the front and rear housing sections the elastomeric interlocking band is aligned with the common side periphery of a first one of the front and rear housing sections and then slidably assembled onto the wall segments thereof until the teeth engage with the recesses in the elastomeric interlocking band, thereby latching the elastomeric interlocking band to the first one of the front and rear housing sections. A remaining one of the front and rear housing sections is thereafter aligned with the common side periphery, after which the wall segments thereof are slidably assembled into the elastomeric interlocking band until the teeth of the wall segments also engage with the recesses in the elastomeric interlocking band, thereby latching together the front and rear housing sections.

A fourth aspect of the present invention is a selective call receiver comprising electronic elements, including an antenna for intercepting a selective call radio signal including an address and information, and a receiver element coupled to the antenna for demodulating the selective call radio signal to produce a demodulated signal. The electronic elements also include a processor coupled to the receiver element for processing the demodulated signal to derive the address and information, and an alerting device coupled to the processor for generating an alert in response to the address matching a predetermined address. The selective call receiver further comprises a housing mechanically coupled to the electronic elements for enclosing and supporting the electronic elements. The housing includes a latch system, comprising front and rear housing sections having outer and inner surfaces and a common side periphery when assembled. The front and rear housing sections comprise a plurality of wall segments projecting rearward from the inner surface of the front housing section and projecting forward from the inner surface of the rear housing section. Each wall segment has a locking side positioned adjacent and parallel to the common side periphery and has a tooth thereon projecting from the locking side, the tooth positioned for mating with an elastomeric interlocking band. The latch system further comprises the elastomeric interlocking band, which comprises recesses therein for engaging with the teeth of the wall segments. To latch together the front and rear housing sections the elastomeric interlocking band is aligned with the common side periphery of a first one of the front and rear housing sections and then slidably assembled onto the wall segments thereof until the teeth engage with the recesses in the elastomeric interlocking band, thereby latching the elastomeric interlocking band to the first one of the front and rear housing sections. A remaining one of the front and rear housing sections is thereafter aligned with the common side periphery, after which the wall segments thereof are slidably assembled into the elastomeric interlocking band until the teeth of the wall segments also engage with the recesses in the elastomeric interlocking band, thereby latching together the front and rear housing sections.

BRIEF DESCRIPTION OF THE DRAWINGS

FIG. 10 is an orthographic cross-section view of a portion of the front and rear housing sections and the elastomeric interlocking band in accordance with the first alternative embodiment of the present invention, the view taken along line 1 of FIG. 4.

FIG. 11 is an orthographic cross-section view of a portion of the front and rear housing sections and the elastomeric interlocking band in accordance with the first alternative embodiment of the present invention, the view taken along line 2 of FIG. 4.

FIG. 12 is an orthographic cross-section view of a portion of the front and rear housing sections and an elastomeric interlocking band in accordance with a second alternative embodiment of the present invention.

FIG. 13 is an orthographic cross-section view of a portion of the front and rear housing sections and the elastomeric interlocking band in accordance with the second alternative embodiment of the present invention.

DESCRIPTION OF THE PREFERRED EMBODIMENT

Figure 1:
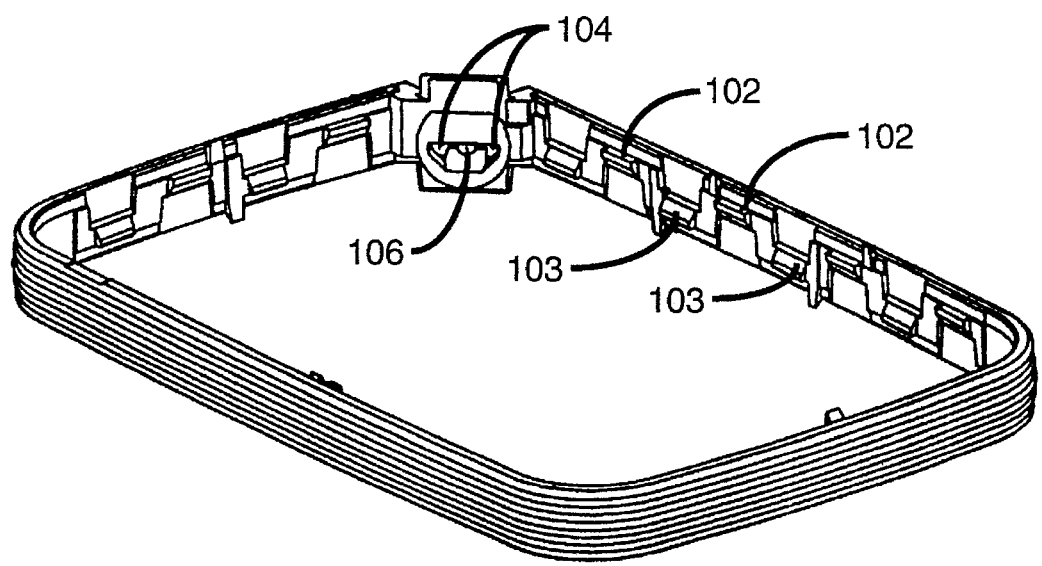
FIG. 1 is an isometric view of an elastomeric interlocking band in accordance with the preferred embodiment of the present invention.

Referring to FIG. 1, an isometric view depicts an elastomeric interlocking band 100 in accordance with the preferred embodiment of the present invention. The elastomeric interlocking band 100 preferably is formed as a contiguous, one-piece molded component, comprising first and second pluralities of teeth 102, 103 for interlocking with front and rear housing sections 204, 202 (FIG. 2), respectively. Apertures 104 through the elastomeric interlocking band 100 serve as a sound port for an alerting device (not shown). A lanyard pin 106 is mounted into the elastomeric interlocking band 100 for attaching a lanyard. The material utilized for the elastomeric interlocking band 100 preferably is a polycarbonate/polyurethane blend, such as Texin 4215 or 3215, manufactured by Miles, Inc., of Pittsburgh, Pa. It will be appreciated that other similar materials, such as an untilled nylon, e.g., Zytel Z101 or Z211 manufactured by Dupont Corporation of Wilmington, Del., can be utilized as well for the elastomeric interlocking band 100.

Figure 2:
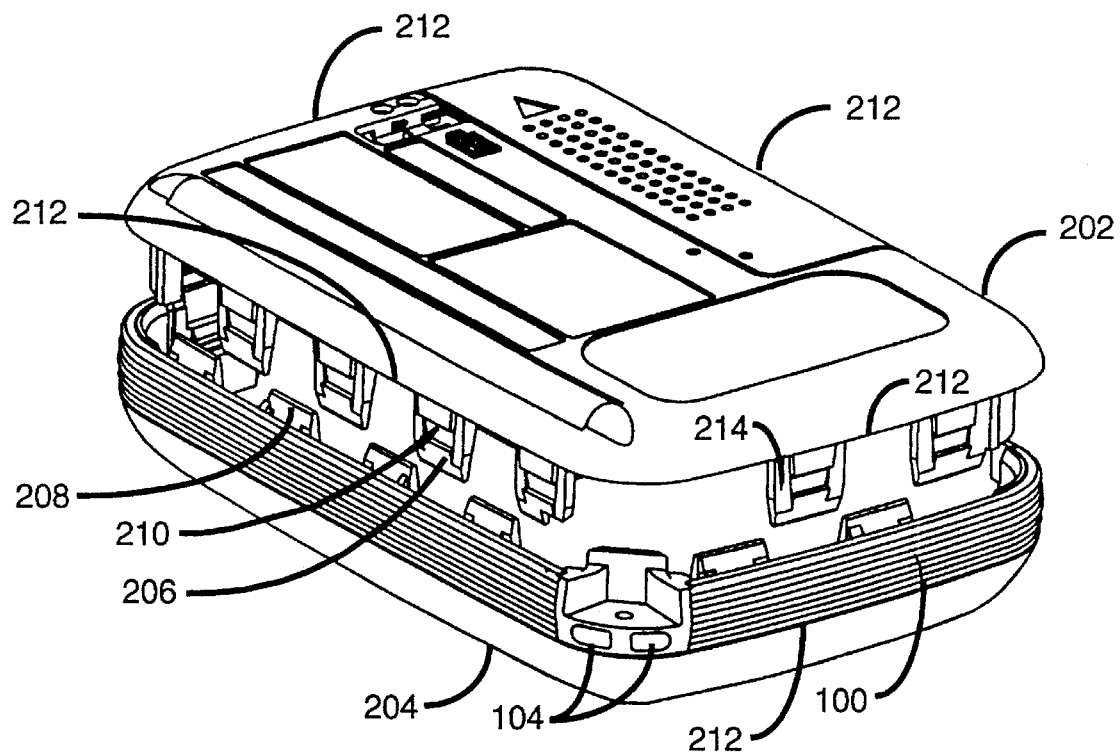
FIG. 2 is an isometric view of the elastomeric interlocking band latched to a front housing section with a rear housing section in position for assembly in accordance with the preferred embodiment of the present invention.

Referring to FIG. 2, an isometric view depicts the elastomeric interlocking band 100 latched to the front housing section 204 with the rear housing section 202 in position for assembly in accordance with the preferred embodiment of the present invention. The rear housing section 202 comprises a plurality of wall segments 206, which project from the inner surface of the rear housing section 202 towards the front housing section 204. The plurality of wall segments 206 each have a locking side 214 positioned adjacent and parallel to a common side periphery 212 of the front and rear housing sections 204, 202. The plurality of wall segments 206 each have a recess 210 in the locking side 214 for mating with the second plurality of teeth 103 of the elastomeric interlocking band 100.

The front housing section 204 comprises a plurality of wall segments 208, which project from the inner surface of the front housing section 204 towards the rear housing section 202. The plurality of wall segments 208 also each have a locking side 214 positioned adjacent and parallel to the common side periphery 212 of the front and rear housing sections 204, 202. The plurality of wall segments 208 each have a recess 402 (FIG. 4) in the locking side 214 for mating with the first plurality of teeth 102 of the elastomeric interlocking band 100. Preferably, the front and rear housing sections 204, 202 are manufactured from a polycarbonate plastic. It will be appreciated that other similar materials can be utilized as well for the front and rear housing sections 204, 202.

To latch the elastomeric interlocking band 100 to the front housing section 204 as depicted in FIG. 2, the elastomeric interlocking band 100 is first aligned with the common side periphery 212 of the front housing section 204 and then slidably assembled onto the wall segments 208 until the first plurality of teeth 102 engage with the recesses 402 in the wall segments 208, thereby latching the elastomeric interlocking band 100 to the front housing section 204.

Figure 3:
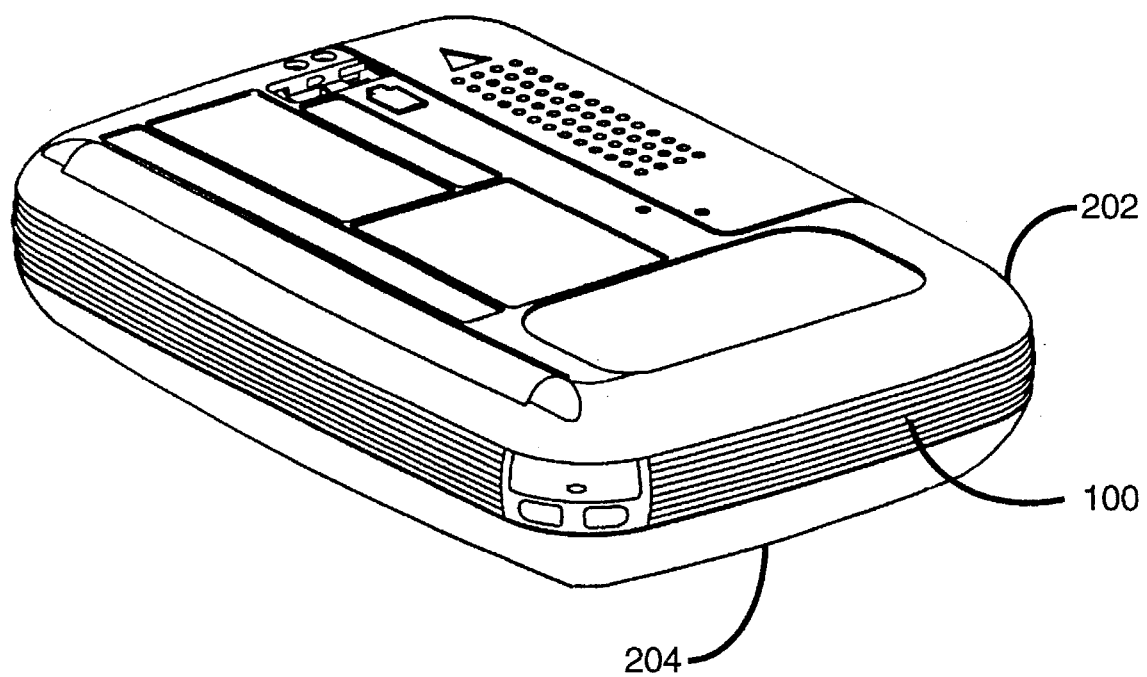
FIG. 3 is an isometric view of the elastomeric interlocking band latched to front and rear housing sections forming an assembled housing in accordance with the preferred embodiment of the present invention.

Referring to FIG. 3, an isometric view depicts the elastomeric interlocking band 100 latched to the front and rear housing sections 204, 202 forming an assembled housing in accordance with the preferred embodiment of the present invention. To latch the rear housing section 202 to the latched assembly of the elastomeric interlocking band 100 and the front housing section 204, the rear housing section 202 is aligned with the common side periphery 212, as depicted in FIG. 2. Following alignment, the wall segments 206 of the rear housing section 202 are slidably assembled into the elastomeric interlocking band 100 until the second plurality of teeth 103 engage with the recesses 210 in the wall segments 206 of the rear housing section, thereby latching together the front and rear housing sections 204, 202.

To open the housing (for servicing, etc.), a suitable tool, such as a small screwdriver blade, can be pressed against the inside of the elastomeric interlocking band 100 (accessible through a battery compartment door, for example) to stretch the elastomeric interlocking band 100 away from engagement with the recesses 210, 402 of the wall segments 206, 208 in the vicinity of the tool. Then the tool can be worked around the sides of the housing until the elastomeric interlocking band 100 can be removed from the front and rear housing sections 204, 202.

Preferably, when the elastomeric interlocking band 100 is in place between the front and rear housing sections 204, 202, the elastomeric interlocking band 100 is somewhat longitudinally stretched by the wall segments 206, 208. In addition, the housing dimensions are such that the elastomeric interlocking band 100 is squeezed slightly between overlapping edges of the front and rear housing sections 204, 202. The effect of the above described stretching and squeezing is to form a tight seal between the elastomeric interlocking band 100 and the front and rear housing sections 204, 202, thereby advantageously providing a water-resistant housing. In addition, when the elastomeric interlocking band 100 is tightly fitted to the front and rear housing sections 204, 202, operation of the latch system is non-obvious to the untrained user, thereby advantageously deterring the untrained user from opening the housing.

Figure 4:
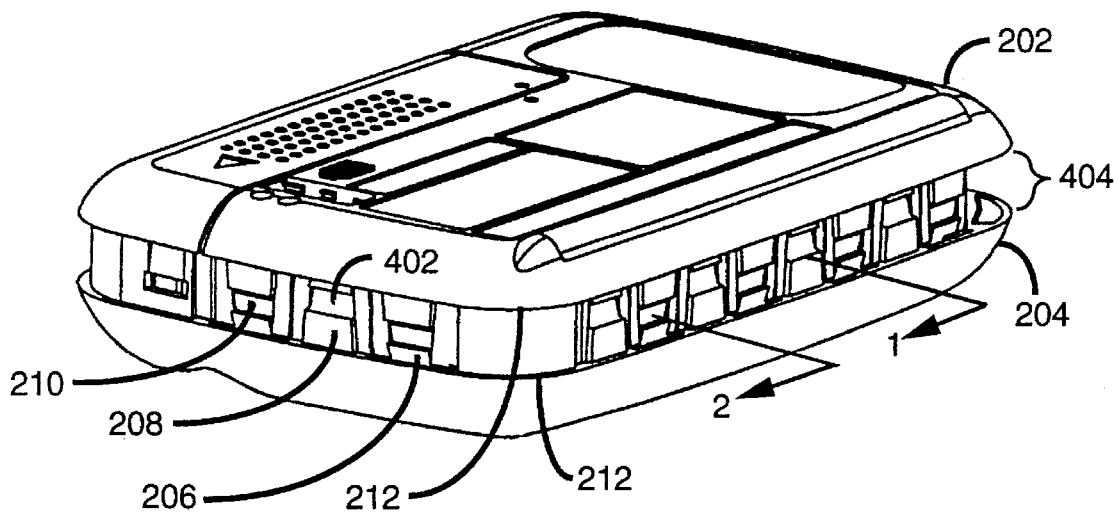
FIG. 4 is an isometric view of the front and rear housing sections assembled together with the elastomeric interlocking band removed.

Referring to FIG. 4, an isometric view depicts the front and rear housing sections 204, 202 assembled together, with the elastomeric interlocking band 100 removed for illustrative purposes. The view of FIG. 4 clearly depicts the wall segments 208, 206 projecting from the front and rear housing sections 204, 202 and the recesses 402, 210 therein for engaging with the first and second pluralities of teeth 102, 103 of the elastomeric interlocking band 100. FIG. 4 also shows that the wall segments 208, 206 are staggered such that they do not interfere mechanically with one another when the front and rear housing sections are assembled. In addition, FIG. 4 clearly illustrates that the wall segments 208, 206 and the front and rear housing sections 204, 202 when assembled form a channel 404 encircling the common side periphery 212 between the front and rear housing sections 204, 202. When the elastomeric interlocking band 100 is assembled to the front and rear housing sections 204, 202 (as shown in FIG. 3), the channel 404 mechanically captures the elastomeric interlocking band 100 between the front and rear housing sections 204, 202.

Figure 6:
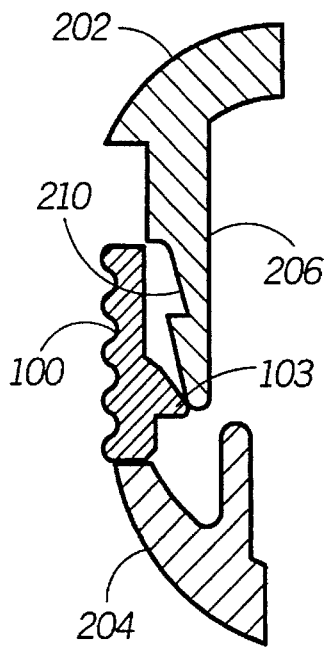
FIG. 6 is an orthographic cross-section view of a portion of the front and rear housing sections at the start of assembly of the rear housing section to the elastomeric interlocking band in accordance with the preferred embodiment of the present invention, the view taken along line 2 of FIG. 4.
Figure 7:
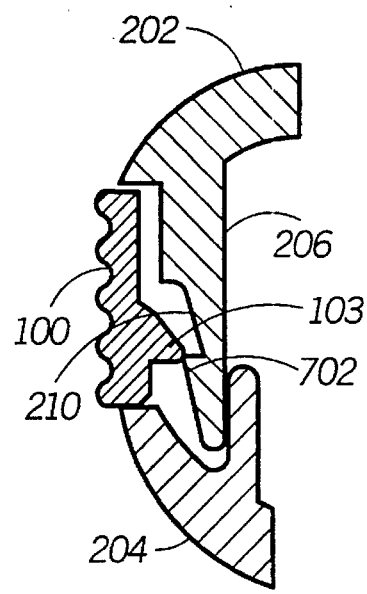
FIG. 7 is an orthographic cross-section view of a portion of the front and rear housing sections near the completion of assembly of the rear housing section to the elastomeric interlocking band in accordance with the preferred embodiment of the present invention, the view taken along line 2 of FIG. 4.
Figure 5:
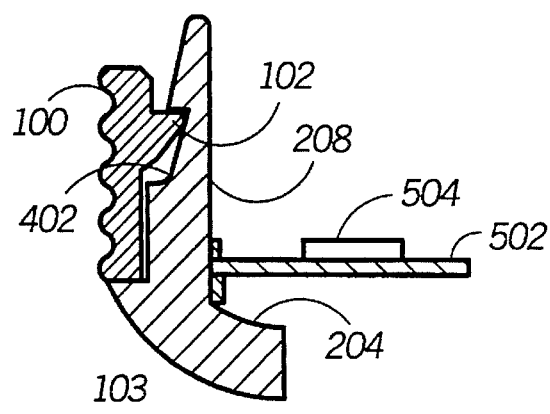
FIG. 5 is an orthographic cross-section view of a portion of the front housing section with the elastomeric interlocking band assembled thereto in accordance with the preferred embodiment of the present invention, the view taken along line 1 of FIG. 4.
Figure 8:
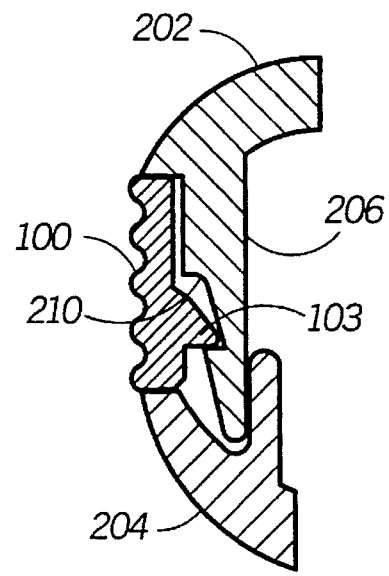
FIG. 8 is an orthographic cross-section view of a portion of the front and rear housing sections after the completion of assembly of the rear housing section to the elastomeric interlocking band in accordance with the preferred embodiment of the present invention, the view taken along line 2 of FIG. 4.

Referring to FIG. 5, an orthographic cross-section view depicts a portion of the front housing section 204 with the elastomeric interlocking band 100 assembled thereto in accordance with the preferred embodiment of the present invention, the view taken along line 1 of FIG. 4. FIG. 5 also depicts a printed wiring board 502 mechanically and electrically coupled to electronic components 504 and mechanically coupled to the front housing section 204 for support and protection of the electronic components. The view of FIG. 5 depicts one of the first plurality of teeth 102 of the elastomeric interlocking band 100 engaged with the recess 402 of the wall segment 208 of the front housing section 204, thereby latching together the elastomeric Referring to FIGS. 6, 7, and 8, orthographic cross-section views depict a portion of the front and rear housing sections 204, 202 at the start, near completion, and after completion of assembly of the rear housing section 202 to the elastomeric interlocking band 100 in accordance with the preferred embodiment of the present invention, the view taken along line 2 of FIG. 4. FIGS. 6 and 7 illustrate that as the wall segment 206 is slidably assembled into the elastomeric interlocking band 100, the elastomeric interlocking band 100 is stretched outward, allowing the depicted one of the second plurality of teeth 103 to clear the lower edge 702 of the wall segment 206. When the wall segment 206 has moved far enough for the tooth 103 to clear the lower edge of the recess 210, the elasticity of the elastomeric interlocking band 100 causes the tooth 103 to snap into the recess 210 (as depicted in FIG. 8), thereby latching the rear housing section 202 to the elastomeric interlocking band 100, and thus also to the front housing section 204.

Figure 9:
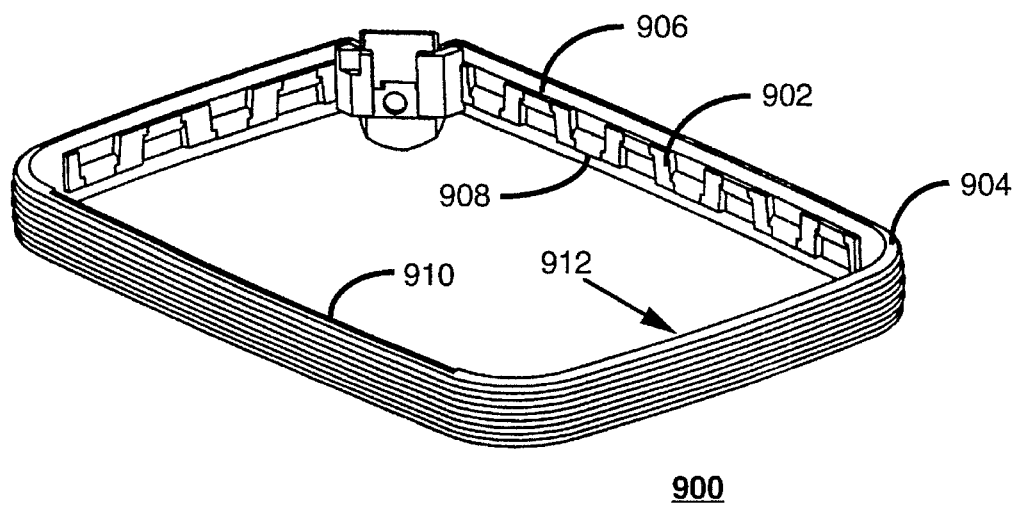
FIG. 9 is an isometric view of an elastomeric interlocking band in accordance with a first alternative embodiment of the present invention.

Referring to FIG. 9, an isometric view depicts an elastomeric interlocking band 900 in accordance with a first alternative embodiment of the present invention. The elastomeric interlocking band 900 comprises relatively hard strips 902, 910, 912 of material embedded in an elastomeric carrier 904. Preferably, the strip 902 extends around two adjacent sides of the elastomeric interlocking band 900, the strip 910 extends for substantially the length of one side, and the strip 912 (not visible in FIG. 9) extends for substantially the length of a remaining side. The strips 902, 910, 912 comprise first and second pluralities of teeth 906, 908 for engaging with the recesses 402, 210 of the front and rear housing sections 204, 202.

The material utilized for the strips 902, 910, 912 preferably is a rigid or semi-rigid plastic, such as a polycarbonate plastic, that can bond to the elastomeric carrier 904. A preferable material for the elastomeric carrier 904 is a polyester, such as Texin 688A. It will be appreciated that other similar materials can be utilized as well for the elastomeric carrier 904. Such other similar materials include, Texin 591A polyester, a polyether such as Texin 985A or 990A, butyl rubber, and silicone. These materials all are readily available off-the-shelf.

Referring to FIG. 10, an orthographic cross-section view depicts a portion of the front and rear housing sections 204, 202 and the elastomeric interlocking band 900 in accordance with the first alternative embodiment of the present invention, the view taken along line 1 of FIG. 4. The view shows the strip 902 embedded in the elastomeric carrier 904. The tooth 906 is engaged with the recess 402, latching the front housing section 204 to the elastomeric interlocking band 900.

Referring to FIG. 11, an orthographic cross-section view depicts a portion of the front and rear housing sections 204, 202 and the elastomeric interlocking band 900 in accordance with the first alternative embodiment of the present invention, the view taken along line 2 of FIG. 4. The view shows the tooth 908 engaged with the recess 210, latching the rear housing section 202 to the elastomeric interlocking band 900. It will be appreciated that the elastomeric interlocking band 900 and the elastomeric interlocking band 100 function similarly to latch together the front and rear housing sections 204, 202, the essential difference being the internal structures of the elastomeric interlocking bands 100, 900.

Referring to FIGS. 12 and 13, orthographic cross-section views depict a portion of front and rear housing sections 204, 202 and an elastomeric interlocking band 1202 in accordance with a second alternative embodiment of the present invention. The elastomeric interlocking band 1202 cooperates with the front and rear housing sections 204, 202 to latch them together in a manner similar to the elastomeric interlocking band 100. The essential difference between the elastomeric interlocking band 1202 in accordance with the second alternative embodiment and the elastomeric interlocking band 100 in accordance with the preferred embodiment is that the elastomeric interlocking band 1202 comprises recesses 1208, 1306 for engaging with teeth 1206, 1304 that project from wall segments 1204, 1302, respectively.

Figure 14:
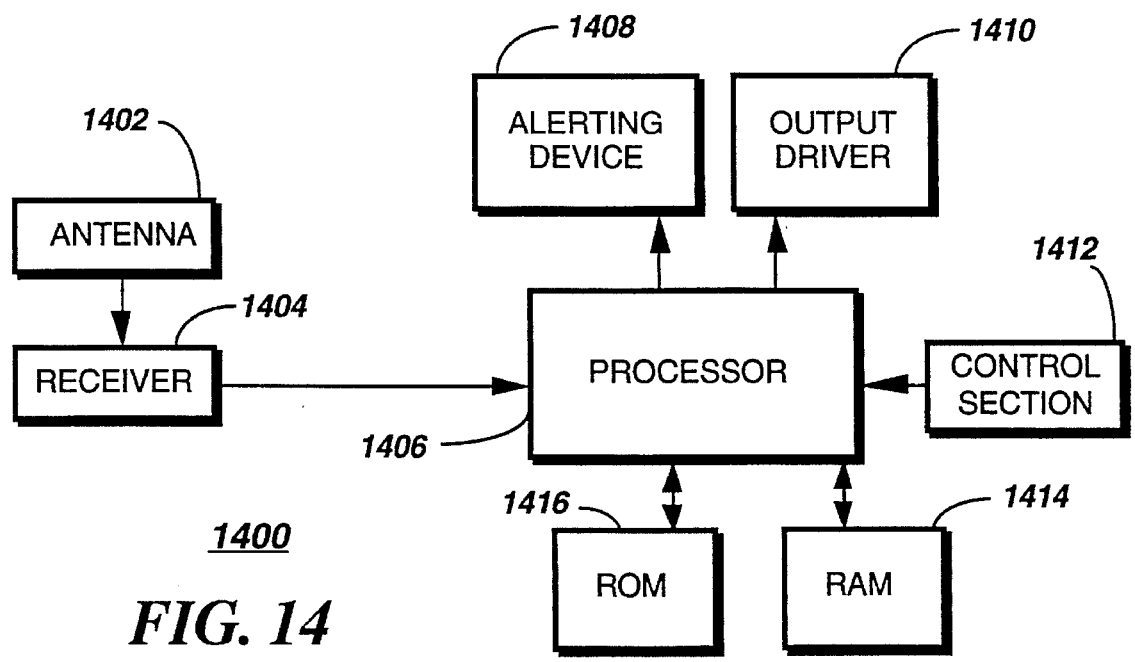
FIG. 14 is an electrical block diagram of a selective call receiver in accordance with the preferred embodiment of the present invention.

Referring to FIG. 14, an electrical block diagram depicts electronic elements 1400 of a selective call receiver in accordance with the preferred embodiment of the present invention. The electronic elements 1400 comprise an antenna 1402 for intercepting communication signals including information. A receiver element 1404 is coupled to the antenna 1402 for demodulating the communication signals to derive the information. The receiver element 1404 is preferably similar to the receiver element of the model A03KLB5962CA ADVISOR® pager, manufactured by Motorola, Inc. of Schaumburg, Ill. A processor 1406 is coupled to the receiver element 1404 for processing the information. Preferably, the processor 1406 is similar to the MC68HC05, C08, or C11 series microcomputer manufactured by Motorola, Inc. of Schaumburg, Ill. The electronic elements 1400 further comprise an alerting device 1408 for generating an alert through, for example, a conventional piezoelectric transducer. The alerting device 1408 is coupled to the processor 1406 for generating the alert responsive to the information received. An output driver 1410, for driving, for example, a well-known liquid crystal display or a speaker, is coupled to the processor 1406 for visibly or audibly reproducing the information received. A control section 1412, comprising well-known knobs, switches, and buttons, is coupled to the processor 1406 for allowing a user to control the selective call receiver. A conventional random access memory (RAM) 1414 is coupled to the processor 1406 for storing the information received. A conventional read-only memory (ROM) 1416 is also coupled to the processor 1406 for storing operating software and other necessary parameters.

It will be appreciated that other types of ROM, e.g., electrically erasable programmable ROM (EEPROM) and electrically alterable ROM (EAROM), can be utilized as well for the ROM 1416, and further that the processor 1406, the ROM 1416, and the RAM 1414 can be fabricated as a contiguous integrated circuit in an alternative embodiment in accordance with the present invention.

Thus, it should be apparent that the present invention provides a tamper-resistant housing latch system that also incorporates a water-resistant seal without requiring additional parts and labor for manufacture. Furthermore, the present invention provides a latch system that advantageously allows a simple, single-axis housing assembly direction that facilitates manufacture.

What is claimed is:

1. A latch system for a housing, the latch system comprising:

front and rear housing sections having outer and inner surfaces and a common side periphery when assembled, the front and rear housing sections comprising a plurality of wall segments projecting rearward from the inner surface of the front housing section and projecting forward from the inner surface of the rear housing section, each wall segment having a locking side positioned adjacent and parallel to the common side periphery and having a recess therein on said locking side, the recess positioned for mating with a contiguous elastomeric interlocking band; and the contiguous elastomeric interlocking band, comprising teeth projecting therefrom for engaging with the recesses in the wall segments, wherein to latch together the front and rear housing sections the contiguous elastomeric interlocking band is aligned with the common side periphery of a first one of the front and rear housing sections and then slidably assembled onto the wall segments thereof until the teeth engage with the recesses in the wall segments, thereby latching the contiguous elastomeric interlocking band to the first one of the front and rear housing sections, and wherein a remaining one of the front and rear housing sections is thereafter aligned with the common side periphery, after which the wall segments thereof are slidably assembled into the contiguous elastomeric interlocking band until the teeth thereof also engage with the recesses in the wall segments of said remaining one of the front and rear housing sections, thereby latching together the front and rear housing sections, wherein the front and rear housing sections and the elastomeric interlocking band are arranged such that assembly can be accomplished in a single-axis housing assembly direction.

2. The latch system of claim 1, wherein the plurality of wall segments and the front and rear housing sections when assembled form a channel encircling the common side periphery between the front and rear housing sections, the channel mechanically capturing the contiguous elastomeric interlocking band.

3. The latch system of claim 1, wherein the plurality of wall segments are staggered such that they do not interfere mechanically with one another when the front and rear housing sections are assembled.

4. The latch system of claim 1, wherein the contiguous elastomeric interlocking band is manufactured from at least one material selected from a group consisting of a polyurethane/polycarbonate blend, nylon, polyester, polyether, butyl rubber, a polycarbonate plastic, and silicone.

5. The latch system of claim 1, wherein the contiguous elastomeric interlocking band comprises relatively hard strips of material embedded in an elastomeric carrier.

6. The latch system of claim 1, wherein the front and rear housing sections are manufactured from a polycarbonate plastic.

7. The latch system of claim 1, wherein the contiguous elastomeric interlocking band comprises a lanyard pin mounted therein for attaching a lanyard.

8. The latch system of claim 7, wherein the contiguous elastomeric interlocking band has at least one aperture proximate the lanyard pin for porting sound from an alerting device within the housing.

9. A selective call receiver comprising:
   electronic elements, including:
      an antenna for intercepting a selective call radio signal including an address and information;
      a receiver element coupled to the antenna for demodulating the selective call radio signal to produce a demodulated signal;
      a processor coupled to the receiver element for processing the demodulated signal to derive the address and information;
      an alerting device coupled to the processor for generating an alert in response to the address matching a predetermined address;
   a housing mechanically coupled to the electronic elements for enclosing and supporting the electronic elements, wherein the housing includes a latch system, comprising:
      front and rear housing sections having outer and inner surfaces and a common side periphery when assembled, the front and rear housing sections comprising a plurality of wall segments projecting rearward from the inner surface of the front housing section and projecting forward from the inner surface of the rear housing section, each wall segment having a locking side positioned adjacent and parallel to the common side periphery and having a recess therein on said locking side, the recess positioned for mating with a contiguous elastomeric interlocking band; and
      the contiguous elastomeric interlocking band, comprising teeth projecting therefrom for engaging with the recesses in the wall segments, wherein to latch together the front and rear housing sections the contiguous elastomeric interlocking band is aligned with the common side periphery of a first one of the front and rear housing sections and then slidably assembled onto the wall segments thereof until the teeth engage with the recesses in the wall segments, thereby latching the contiguous elastomeric interlocking band to the first one of the front and rear housing sections, and wherein a remaining one of the front and rear housing sections is thereafter aligned with the common side periphery, after which the wall segments thereof are slidably assembled into the contiguous elastomeric interlocking band until the teeth thereof also engage with the recesses in the wall segments of said remaining one of the front and rear housing sections, thereby latching together the front and rear housing sections, wherein the front and rear housing sections and the elastomeric interlocking band are arranged such that assembly can be accomplished in a single-axis housing assembly direction.

10. The selective call receiver of claim 9, wherein the plurality of wall segments and the front and rear housing sections when assembled form a channel encircling the common side periphery between the front and rear housing sections, the channel mechanically capturing the contiguous elastomeric interlocking band.

11. The selective call receiver of claim 9, wherein the plurality of wall segments are staggered such that they do not interfere mechanically with one another when the front and rear housing sections are assembled.

12. The selective call receiver of claim 9, wherein the contiguous elastomeric interlocking band is manufactured from a material selected from a group consisting of a polyurethane/polycarbonate blend, nylon, polyester, polyether, butyl rubber, a polycarbonate plastic, and silicone.

13. The selective call receiver of claim 9, wherein the contiguous elastomeric interlocking band comprises relatively hard strips of material embedded in an elastomeric carrier.

14. The selective call receiver of claim 9, wherein the front and rear housing sections are manufactured from a polycarbonate plastic.

15. The selective call receiver of claim 9, wherein the contiguous elastomeric interlocking band comprises a lanyard pin mounted therein for attaching a lanyard.

16. The selective call receiver of claim 15, wherein the contiguous elastomeric interlocking band has at least one aperture proximate the lanyard pin for porting sound from the alerting device within the housing.

17. A latch system for a housing, the latch system comprising:
   front and rear housing sections having outer and inner surfaces and a common side periphery when assembled, the front and rear housing sections comprising a plurality of wall segments projecting rearward from the inner surface of the front housing section and projecting forward from the inner surface of the rear housing section, each wall segment having a locking side positioned adjacent and parallel to the common side periphery and having a tooth thereon projecting from said locking side, the tooth positioned for mating with a contiguous elastomeric interlocking band; and
   the contiguous elastomeric interlocking band, comprising recesses therein for engaging with the teeth of the wall segments, wherein to latch together the front and rear housing sections the contiguous elastomeric interlocking band is aligned with the common side periphery of a first one of the front and rear housing sections and then slidably assembled onto the wall segments thereof until the teeth engage with the recesses in the contiguous elastomeric interlocking band, thereby latching the contiguous elastomeric interlocking band to the first one of the front and rear housing sections, and wherein a remaining one of the front and rear housing sections is thereafter aligned with the common side periphery, after which the wall segments thereof are slidably assembled into the contiguous elastomeric interlocking band until the teeth of the wall segments also engage with the recesses in the contiguous elastomeric interlocking band, thereby latching together the front and rear housing sections, wherein the front and rear housing sections and the elastomeric interlocking band are arranged such that assembly can be accomplished in a single-axis housing assembly direction.

18. The latch system of claim 17, wherein the plurality of wall segments and the front and rear housing sections when assembled form a channel encircling the common side periphery between the front and rear housing sections, the channel mechanically capturing the contiguous elastomeric interlocking band.

19. A selective call receiver comprising:

electronic elements, including:
- an antenna for intercepting a selective call radio signal including an address and information;
- a receiver element coupled to the antenna for demodulating the selective call radio signal to produce a demodulated signal;
- a processor coupled to the receiver element for processing the demodulated signal to derive the address and information;
- an alerting device coupled to the processor for generating an alert in response to the address matching a predetermined address;

a housing mechanically coupled to the electronic elements for enclosing and supporting the electronic elements, wherein the housing includes a latch system, comprising:

front and rear housing sections having outer and inner surfaces and a common side periphery when assembled, the front and rear housing sections comprising a plurality of wall segments projecting rearward from the inner surface of the front housing section and projecting forward from the inner surface of the rear housing section, each wall segment having a locking side positioned adjacent and parallel to the common side periphery and having a tooth thereon projecting from said locking side, the tooth positioned for mating with a contiguous elastomeric interlocking band; and the contiguous elastomeric interlocking band, comprising recesses therein for engaging with the teeth of the wall segments, wherein to latch together the front and rear housing sections the contiguous elastomeric interlocking band is aligned with the common side periphery of a first one of the front and rear housing sections and then slidably assembled onto the wall segments thereof until the teeth engage with the recesses in the contiguous elastomeric interlocking band, thereby latching the contiguous elastomeric interlocking band to the first one of the front and rear housing sections, and wherein a remaining one of the front and rear housing sections is thereafter aligned with the common side periphery, after which the wall segments thereof are slidably assembled into the contiguous elastomeric interlocking band until the teeth of the wall segments also engage with the recesses in the contiguous elastomeric interlocking band, thereby latching together the front and rear housing sections, wherein the front and rear housing sections and the elastomeric interlocking band are arranged such that assembly can be accomplished in a single-axis housing assembly direction.

20. The selective call receiver of claim 19, wherein the plurality of wall segments and the front and rear housing sections when assembled form a channel encircling the common side periphery between the front and rear housing sections, the channel mechanically capturing the contiguous elastomeric interlocking band.

* * * * *